US012586894B1

(12) United States Patent
Servel

(10) Patent No.: US 12,586,894 B1
(45) Date of Patent: Mar. 24, 2026

(54) RADIO FREQUENCY DEVICE WITH OPTIMISED RADIATION PATTERN FOR GESTURE SENSING IN A MOTOR VEHICLE

(71) Applicant: VITESCO TECHNOLOGIES GmbH, Regensburg (DE)

(72) Inventor: Eric Servel, Toulouse (FR)

(73) Assignee: VITESCO TECHNOLOGIES GMBH, Regensburg (DE)

(*) Notice: Subject to any disclaimer, the term of this patent is extended or adjusted under 35 U.S.C. 154(b) by 56 days.

(21) Appl. No.: 18/860,532

(22) PCT Filed: May 30, 2023

(86) PCT No.: PCT/EP2023/064359
§ 371 (c)(1),
(2) Date: Oct. 25, 2024

(87) PCT Pub. No.: WO2023/232757
PCT Pub. Date: Dec. 7, 2023

(30) Foreign Application Priority Data

Jun. 3, 2022 (FR) ........................................ 2205365

(51) Int. Cl.
*H01Q 1/32* (2006.01)
*H01Q 9/04* (2006.01)

(52) U.S. Cl.
CPC ......... *H01Q 1/3241* (2013.01); *H01Q 1/3283* (2013.01); *H01Q 9/0407* (2013.01)

(58) Field of Classification Search
CPC ... H01Q 1/3241; H01Q 1/3283; H01Q 9/0407
See application file for complete search history.

(56) References Cited

U.S. PATENT DOCUMENTS 7,009,551 B1 3/2006 Sapletal et al.
9,819,098 B2 11/2017 Gu et al.
(Continued)

FOREIGN PATENT DOCUMENTS

CN 203640488 U 6/2014
CN 107086361 A 8/2017
(Continued)

OTHER PUBLICATIONS

International Search Report and Written Opinion of the ISA for PCT/EP2023/064359, mailed Aug. 25, 2023, 16 pages.

*Primary Examiner* — Graham P Smith
(74) *Attorney, Agent, or Firm* — Nixon & Vanderhye

(57) ABSTRACT

A device (900) for transmitting and/or receiving radio-frequency signals, which is intended to be integrated into a gesture-detecting system in a motor vehicle, and which comprises:
- a printed circuit board (930);
- at least one patch antenna (910), called the T-antenna, comprising superposed a first metal excitation surface and a first ground plane, at least one of the first ground plane and the first metal excitation surface having a T-shaped region, so that the radiation pattern of the T-antenna has two high-radiation side lobes, which are oriented substantially parallel to the plane of the printed circuit board, and separated by a low-radiation central zone; and
- at least one patch antenna (920), called the rectangular antenna, comprising superposed a second metal excitation surface and a second ground plane, the second metal excitation surface comprising a rectangular region having a general rectangle shape and configured so that the radiation pattern of the rectangular antenna has two high-radiation side lobes, which are oriented (Continued)

substantially orthogonal to the plane of the printed circuit board, and separated by a low-radiation central zone.

15 Claims, 9 Drawing Sheets

(56) References Cited

U.S. PATENT DOCUMENTS

| | | | |
|---|---|---|---|
| 10,170,838 | B2 | 1/2019 | Garcia et al. |
| 10,775,493 | B2 | 9/2020 | Santra et al. |
| 11,411,327 | B1 | 8/2022 | Wang et al. |
| 2016/0056544 | A1 | 2/2016 | Garcia et al. |
| 2019/0190156 | A1 | 6/2019 | Kim |
| 2019/0302253 | A1 | 10/2019 | Santra et al. |
| 2021/0165072 | A1 | 6/2021 | Trotta et al. |
| 2022/0365207 | A1 | 11/2022 | Corner et al. |
| 2023/0018226 | A1 | 1/2023 | Schmidt et al. |

FOREIGN PATENT DOCUMENTS

| | | | |
|---|---|---|---|
| CN | 112864602 | A | 5/2021 |
| DE | 102012107284 | A1 | 2/2014 |
| EP | 1795916 | B1 | 4/2009 |
| EP | 3546979 | A1 | 10/2019 |
| JP | 2021097328 | A | 6/2021 |
| WO | 2021000045 | A1 | 1/2021 |
| WO | 2021009028 | A1 | 1/2021 |
| WO | 2021058449 | A1 | 4/2021 |

RADIO FREQUENCY DEVICE WITH OPTIMISED RADIATION PATTERN FOR GESTURE SENSING IN A MOTOR VEHICLE

CROSS-REFERENCE TO RELATED APPLICATIONS

This application is the U.S. national phase of International Application No. PCT/EP2023/064359 filed May 30, 2023 which designated the U.S. and claims priority to FR 2205365 filed Jun. 3, 2022, the entire contents of each of which are hereby incorporated by reference.

TECHNICAL FIELD

The invention relates to the field of motor vehicles and more particularly to a device for transmitting and/or receiving radio-frequency signals, which is intended to form an integral part of a gesture-detecting system in a motor vehicle.

Prior Art

Gesture-detecting systems intended to be integrated into a motor vehicle in order to detect a gesture made by a user located outside, or even inside, said vehicle, are known in the prior art. The gesture detection is then used to control activation of a predetermined function of the motor vehicle, and in particular to open a hatch such as a side door, or a tailgate or a trunk lid.

The gesture detection is advantageously based on transmission of a radio-frequency signal and analysis of a return signal sent back by the environment, and in particular by a moving target in this environment. The analysis may comprise determining a phase shift related to an instantaneous position of the target and/or determining a Doppler frequency related to an instantaneous velocity of the target.

Throughout this text, the term "radio-frequency" refers to an electromagnetic signal the carrier frequency of which is between 3 kHz and 300 GHz, and more preferably between 2 GHz and 30 GHz.

As for example described in patent application EP 3 546 979, the radio-frequency signal may be transmitted and received using at least one patch antenna integrated into a printed circuit board. A patch antenna comprises a metal excitation surface, generally of square shape, separated from a ground plane by a dielectric substrate. Patch antennas have the advantage of generating a wide-aperture beam, oriented along an axis orthogonal to the plane of the printed circuit board. FIG. 1A schematically illustrates a motor vehicle 1 equipped with such a transmitting and/or receiving device 10, here placed at the rear of the vehicle 1.

FIGS. 1B and 1C schematically show, as seen from above, a rear region of the vehicle 1. The transmitting and/or receiving device 10 is located in a central region of a rear edge of the vehicle 1. FIGS. 1B and 1C also show the foot 11 of a user preparing to make a predetermined gesture intended to open the tailgate of the vehicle.

In FIG. 1B, the foot 11 is positioned at a distance d0 from the rear edge of the vehicle, facing the transmitting and/or receiving device 10. The foot 11 is then at a distance d1 from the transmitting and/or receiving device 10. In FIG. 1C, the foot 11 is still at a distance do from the rear edge of the vehicle, but it is offset laterally relative to the transmitting and/or receiving device 10. The foot 11 is then at a distance d2 from the transmitting and/or receiving device 10, with d2 much greater than d1.

The power transmitted by a radio-frequency antenna decreases as $1/d^2$, with d the distance to the target. The power of the signal returning to the transmitting and/or receiving device 10 therefore varies as the square of $1/d^2$.

One objective of the invention is to provide a solution that makes it possible not to blind the antenna when the foot is positioned as in FIG. 1B, while being capable of detecting a movement when the foot is positioned as in FIG. 1C. Stated otherwise, one objective of the present invention is to provide a device for transmitting and/or receiving radio-frequency signals that is intended to be integrated into a gesture-detecting system in a motor vehicle, and that makes it possible to limit the influence of the placement of the target (for example the foot of the user), i.e. whether the foot is aligned or offset laterally relative to the transmitting and/or receiving device.

SUMMARY OF THE INVENTION

This objective is achieved with a device for transmitting and/or receiving radio-frequency signals, which is intended to be integrated into a gesture-detecting system in a motor vehicle, and which comprises:

a printed circuit board;

at least one first radio-frequency antenna, integrated into the printed circuit board and dedicated to transmitting and/or receiving a radio-frequency signal propagating through a first detection zone; and at least one second radio-frequency antenna, integrated into the printed circuit board and dedicated to transmitting and/or receiving a radio-frequency signal propagating through a second detection zone distinct from the first detection zone.

According to the invention:

the at least one first radio-frequency antenna is configured to have a radiation pattern with two high-radiation side lobes separated by a low-radiation central zone, the two lobes being oriented substantially parallel to the plane of the printed circuit board; and the at least one second radio-frequency antenna is configured to have a radiation pattern with two high-radiation side lobes separated by a low-radiation central zone, the two lobes being oriented substantially orthogonal to the plane of the printed circuit board (the term "substantially" being defined below).

More particularly, according to the invention:

the at least one first radio-frequency antenna consists of at least one patch antenna, called the T-antenna, comprising superposed a first metal excitation surface and a first ground plane, at least one of the first ground plane and the first metal excitation surface having a T-shaped region, so that the radiation pattern of the T-antenna has two high-radiation side lobes separated by a low-radiation central zone; and the at least one second radio-frequency antenna consists of at least one patch antenna, called the rectangular antenna, comprising superposed a second metal excitation surface and a second ground plane, the second metal excitation surface comprising a rectangular region having a general rectangle shape and configured so that the radiation pattern of the rectangular antenna has two high-radiation side lobes separated by a low-radiation central zone.

By virtue of its T-shaped region, the at least one T-antenna has a radiation pattern with two high-radiation side lobes separated by a low-radiation central zone. Thus, the variation in the intensity of the radio-frequency signal returned by the target, depending on whether said target is aligned or offset laterally relative to the antenna, is greatly reduced.

By virtue of its rectangular region, the at least one rectangular antenna has a radiation pattern with two high-radiation side lobes separated by a low-radiation central zone. Thus, the variation in the intensity of the radio-frequency signal returned by the target, depending on whether said target is aligned or offset laterally relative to the antenna, is greatly reduced.

The invention thus makes it possible to provide a device for transmitting and/or receiving radio-frequency signals that is intended to be integrated into a gesture-detecting system in a motor vehicle, and that makes it possible to limit the influence of the placement of the target, i.e. whether the foot is aligned or offset laterally relative to the transmitting and/or receiving device.

An obvious solution to solve this technical problem would have been to use pairs of antennas, each transmitting in one of two opposite lateral directions.

The idea behind the invention is to adjust the radiation patterns of patch antennas instead. This solution makes it possible to preserve a limited number of antennas, and therefore to provide a compact device, with a low manufacturing cost.

This compactness is particularly advantageous in the automotive field, where the presence of reinforcements, in particular at the rear of the vehicle, leaves only little space available for elements such as the device according to the invention.

The invention further provides a wide viewing angle, by virtue of the use of patch antennas.

The T-antenna according to the invention further allows transmission in a direction not orthogonal to the plane of the printed circuit board, without resorting to an array of square patch antennas. Once again, optimum compactness is guaranteed.

Advantageously:

the first detection zone is oriented in a plane substantially parallel to the plane of the printed circuit board; and the second detection zone is oriented in a plane substantially orthogonal to the plane of the printed circuit board.

Preferably:

the two high-radiation side lobes of the radiation pattern of the T-antenna are oriented along two respective axes, both located in a plane that is substantially parallel to the plane of the printed circuit board; and the two high-radiation side lobes of the radiation pattern of the rectangular antenna are oriented along two respective axes, both located in a plane that is substantially orthogonal to the plane of the printed circuit board.

By "substantially parallel to the plane of the printed circuit board", what is meant is "inclined by less than 20° in absolute value, or even 10° in absolute value, or indeed even 5° in absolute value relative to the plane of the printed circuit board".

By "substantially orthogonal to the plane of the printed circuit board", what is meant is "inclined by less than 20° in absolute value, or even 10° in absolute value, or indeed even 5° in absolute value relative to a plane orthogonal to the plane of the printed circuit board".

Preferably, the T-shaped region has a stem and an arm, where the arm is formed by a first rectilinear bar of length L1, and where the stem is formed by a second rectilinear bar perpendicular to the first rectilinear bar.

Advantageously, a ratio L1/$\lambda_1$ is between 1/8 and 1/6, where $\lambda_1$ is the central wavelength of a radio-frequency signal transmitted and/or received by the T-antenna, in use.

The T-shaped region may have a height L2, defined along an axis parallel to the second rectilinear bar, and a ratio L2/$\lambda_1$ may be between 0.45 and 0.65, where $\lambda_1$ is the central wavelength of a radio-frequency signal transmitted and/or received by the T-antenna, in use.

Advantageously, the T-shaped region belongs to one of the first ground plane and the first metal excitation surface, with the stem of the T superposed and aligned with a rectilinear region of the other of the first ground plane and the first metal excitation surface.

As a variant, the T-shaped region may belong to one of the first ground plane and the first metal excitation surface, and lie facing a second T-shaped region belonging to the other of the first ground plane and the first metal excitation surface.

Preferably, the rectangular region of the rectangular antenna has a height L3 and a width L4, with a ratio L3/L4 greater than or equal to 1.5.

A ratio L3/$\lambda_2$ is advantageously between 0.8 and 1, where $\lambda_2$ is the central wavelength of a radio-frequency signal transmitted and/or received by the rectangular antenna, in use.

A ratio L4/$\lambda_2$ may be between 0.45 and 0.55, where $\lambda_2$ is the central wavelength of a radio-frequency signal transmitted and/or received by the rectangular antenna, in use.

Advantageously:

the T-antenna is configured so that its two high-radiation side lobes are oriented along two respective axes that are inclined to each other by an angle between 120° and 160°; and the rectangular antenna is configured so that its two high-radiation side lobes are oriented along two respective axes that are inclined to each other by an angle between 120° and 160°.

The invention also covers a gesture-detecting system, intended to be integrated into a motor vehicle, and comprising:

a device according to the invention; and a signal-processing module, configured to receive as input an electrical signal from said device, and to analyze said electrical signal so as to deliver as output information relating to a gesture made by a human operator.

Preferably, the system further comprises a unit for controlling opening, configured to receive as input the information relating to a gesture made by a human operator, and to deliver in response an instruction to open a motor-vehicle hatch.

The invention also covers a motor vehicle comprising a device according to the invention, wherein said device is arranged at the rear of the motor vehicle, with one of the first and second detection zones being oriented toward behind the vehicle, and with the other of the first and second detection zones being oriented toward the ground, in use.

DESCRIPTION OF THE FIGURES

Other features and advantages of the invention will become more apparent upon reading the following description. This description is purely illustrative and should be read with reference to the appended drawings, in which.

DETAILED DESCRIPTION OF AT LEAST ONE EMBODIMENT

In at least some of the figures, the axes of an orthonormal coordinate system (Oxyz) have been shown.

Figure 1A:
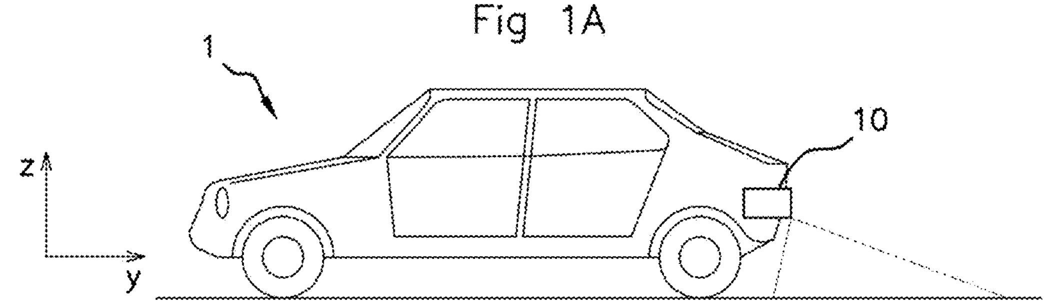
FIG. 1A schematically illustrates a motor vehicle equipped with a transmitting and/or receiving device according to the prior art.
Figure 1B:
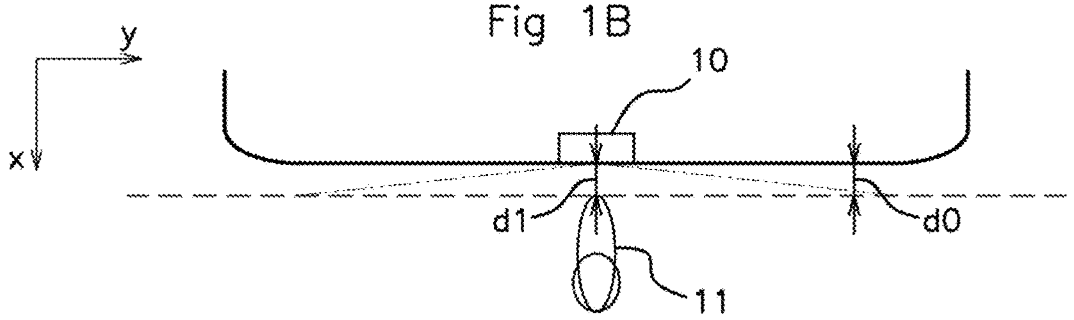
FIG. 1B schematically illustrates the device of FIG. 1A, and a foot positioned facing said device.
Figure 1C:
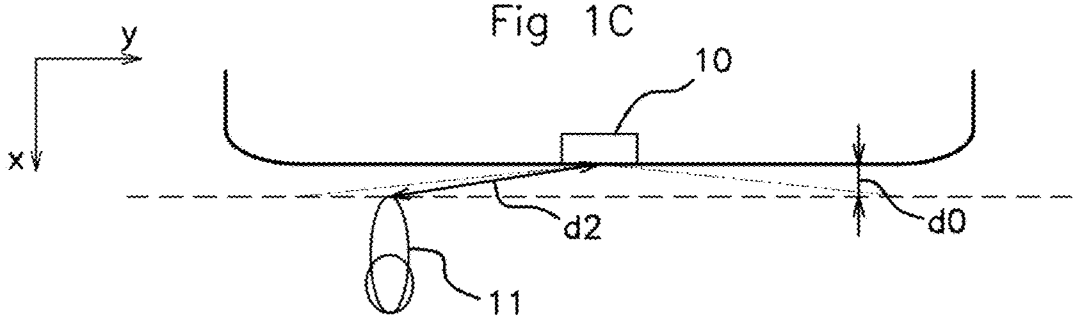
FIG. 1C schematically illustrates the device of FIG. 1A, and a foot offset laterally relative to said device.
Figure 2:
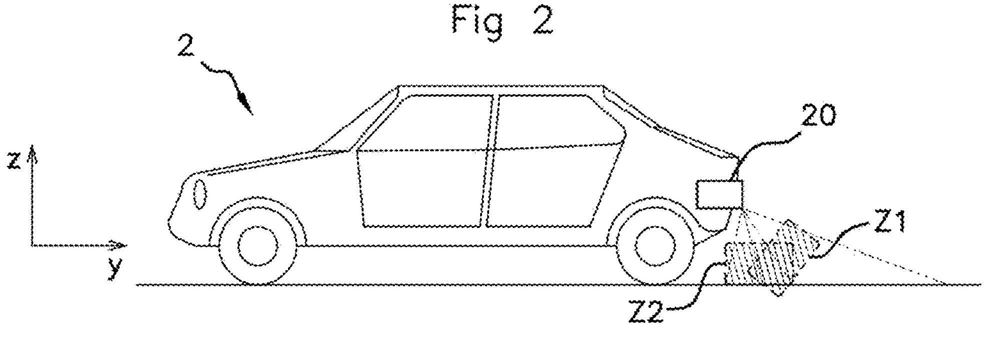
FIG. 2 schematically illustrates a motor vehicle equipped with a transmitting and/or receiving device according to the invention.

FIG. 2 schematically illustrates a motor vehicle 2 equipped with a transmitting and/or receiving device 20 according to the invention.

Here, but non-limitingly, the transmitting and/or receiving device 20 is placed at the rear of the vehicle 2. The device 20 here forms part of a gesture-detecting system intended to detect a foot gesture made by a human operator standing behind the vehicle 2.

According to the invention, the transmitting and/or receiving device 20 comprises:

- a printed circuit board (see below);
- at least one first radio-frequency antenna, dedicated to transmitting and/or receiving a radio-frequency signal propagating through a first detection zone Z1; and
- at least one second radio-frequency antenna, dedicated to transmitting and/or receiving a radio-frequency signal propagating through a second detection zone Z2.

It is possible to have a single first (second, respectively) radio-frequency antenna, performing both signal transmission and reception. As a variant, it is possible to have two first (second, respectively) radio-frequency antennas, performing signal transmission or reception, respectively. This variant surprisingly has a greater compactness.

Here, the first detection zone Z1 extends behind the vehicle 2, while the second detection zone Z2 extends under the vehicle 2. Preferably, the first and second detection zones Z1 and Z2 are contiguous. They together cover an entire zone through which a foot making a swinging motion at the rear of the vehicle 2 moves. Use of these two detection zones achieves optimal discrimination against background gestures such as a walker passing behind the vehicle. Furthermore, the antenna associated with the first transmission zone Z1 may be used to detect a presence in proximity to the vehicle, and to wake up a gesture-detecting system comprising the device 20 according to the invention.

According to the invention:

- the first radio-frequency antenna, associated with the first detection zone Z1, is a patch antenna, called the T-antenna, described below; and
- the second radio-frequency antenna, associated with the second detection zone Z2, is a patch antenna, called the rectangular antenna, described below.

A first embodiment of a T-antenna in a device according to the invention will first be described with reference to FIGS. 3A to 3D.

The T-antenna, 310, is formed on a printed circuit board, and comprises, superposed in this order along an (Oz) axis orthogonal to the (Oxy) plane of the printed circuit board:

- a first metal excitation surface 311;
- a dielectric substrate 312; and
- a first ground plane 313.

Figure 3A:
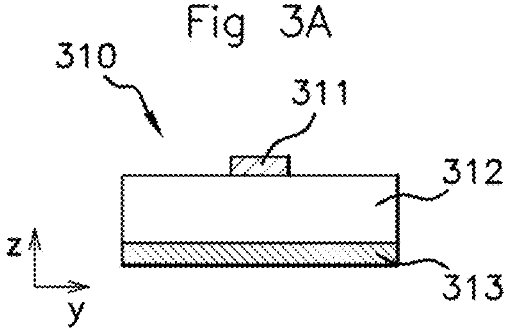
FIG. 3A.

FIG. 3A shows the antenna 310 seen in cross section through an (Oyz) plane orthogonal to the (Oxy) plane.

The first ground plane 313 is an electrically conductive, planar metal surface intended to be electrically connected to the electrical ground of an electrical circuit receiving the antenna 310.

The first metal excitation surface 311 is an electrically conductive, planar metal surface intended to be electrically connected to an electrical power source delivering an electrical excitation signal. The electrical power source is for example an oscillator. The electrical excitation signal has a carrier the frequency of which belongs to the radio-frequency domain.

Preferably, the dimensions of the first ground plane 313 are much greater than those of the first metal excitation surface 311, with a ratio greater than or equal to five, or even ten, between their respective areas.

The dielectric substrate 312 corresponds to a layer of the single-layer or multilayer printed circuit board. The first metal excitation surface 311 and the first ground plane 313 correspond to metallizations on respective faces of said layer.

Figure 3B:
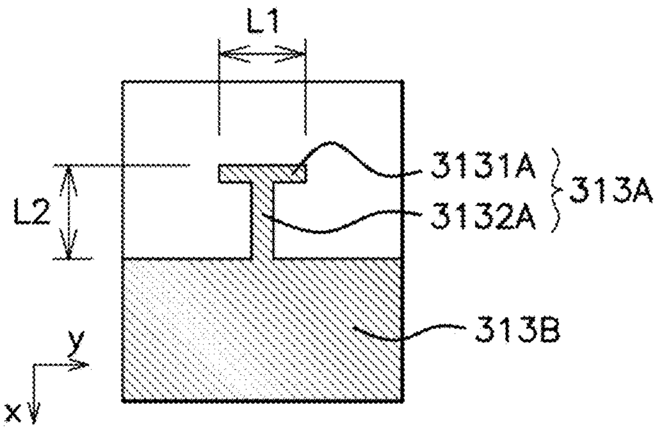
FIG. 3B.

FIG. 3B shows the first ground plane 313, as seen from above in an (Oxy) plane. The first ground plane 313 consists of a T-shaped region, 313A, and a main region 313B, formed together in one piece.

The main region 313B is for example, but non-limitingly, rectangular in shape. Its area is much greater than that of the region 313A, with for example a ratio greater than ten between the respective areas of the regions 313A and 313B.

By "T-shaped", what is meant is "consisting of a first section 3131A forming an arm, and of a second section 3132A forming a stem, where one end of the second section 3132A intercepts a central zone of the first section 3131A".

Preferably, and as shown in FIG. 3B, the first section 3131A and/or the second section 3132A are/is rectilinear. Preferably, and as shown in FIG. 3B, the second section 3132A intercepts the first section 3131A at the center of said first section. Also preferably, and as shown in FIG. 3B, the first section 3131A and the second section 3132A are perpendicular to each other.

The first section 3131A has a length L1. Advantageously, a ratio L1/$\lambda_1$ is between ⅛ and ⅙, with $\lambda_1$ the central wavelength of a radio-frequency signal that the antenna 310 is configured to transmit and/or receive. Thus, the length L1 is for example between 1 mm and 25 mm, for a signal the carrier frequency of which is between 2 GHz and 30 GHz.

The T-shaped region 313A has a height L2. This height L2 is defined in an (Oxy) plane, along an axis perpendicular to the first section 3131A. Here, the height L2 corresponds to the extent of the second section 3132A, increased by the thickness of the first section 3131A.

Advantageously, a ratio L2/$\lambda_1$ is close to 0.5, for example between 0.4 and 0.6, more preferably between 0.45 and 0.55, and even more preferably between 0.48 and 0.52, with $\lambda_1$ such as defined above. Thus, the length L2 is for example between 4 mm and 90 mm, for a signal the carrier frequency of which is between 2 GHz and 30 GHz.

Advantageously, a ratio L2/L1 is between 2.5 and 5, and more preferably between 3 and 4.

Figure 3C:
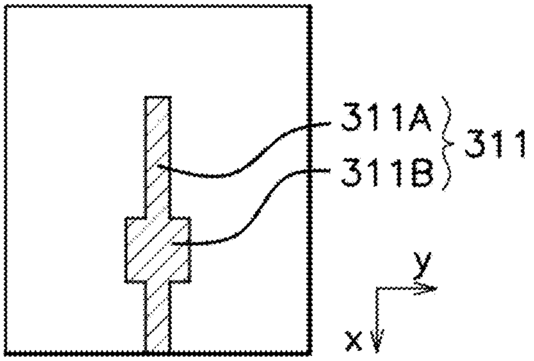
FIG. 3C.

FIG. 3C shows the first metal excitation surface 311, as seen from above in an (Oxy) plane. The first metal excitation surface 311 is here formed by a conductive line 311A, of small width, and by an impedance-matching surface 311B.

One end of the conductive line 311A has the shape of a rectilinear segment. The remainder of the conductive line 311A ensures electrical connection to an electrical power source.

The impedance-matching surface 311B is rectangular in shape, wider than the conductive line 311A and centered on the latter in the width direction. The impedance-matching surface 311B is intended to perform simple impedance matching, to match the impedance of the antenna 310 to the 50 ohm electrical track supplying it with power.

Figure 3D:
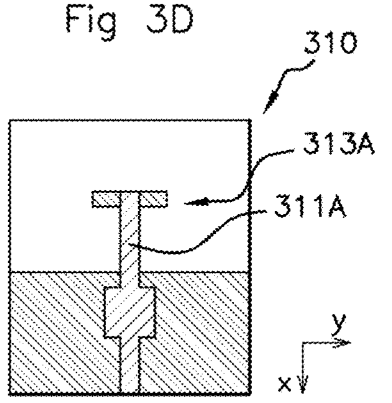
FIG. 3D schematically illustrate various views of a first embodiment of a T-antenna in a transmitting and/or receiving device according to the invention.

FIG. 3D shows the antenna 310, as seen from above in an (Oxy) plane, with a see-through dielectric substrate to make it easier to read the figure. It may be seen that the antenna 310 has planar symmetry, relative to a plane orthogonal to the (Oxy) plane.

FIG. 3D also shows that at least one portion of the rectilinear segment 311A of the first metal excitation surface 311 is superposed with the stem 3132A of the T-shaped region 313A of the first ground plane 313. In particular, said stem 3132A is completely covered by the rectilinear segment 311A. One end of the rectilinear segment 311A extends to face an upper edge of the T-shaped region 313A, level with the arm 3131A of the T-shaped region. Here, and advantageously, the rectilinear segment 311A and the stem 3132A of the T-shaped region have the same width.

The impedance-matching surface 311B for its part is located facing the main region 313B of the first ground plane 313, offset relative to the T-shaped region 313A.

Figure 4A:
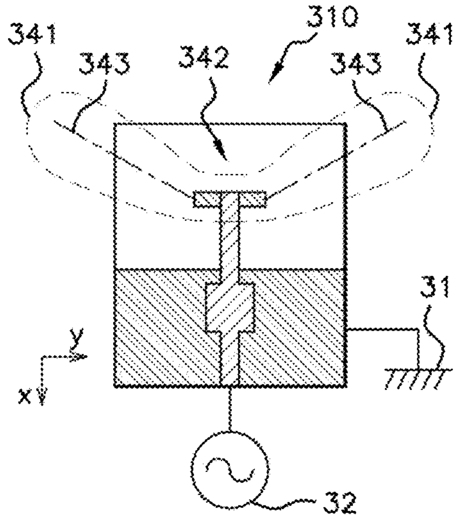
FIG. 4A.
Figure 4B:
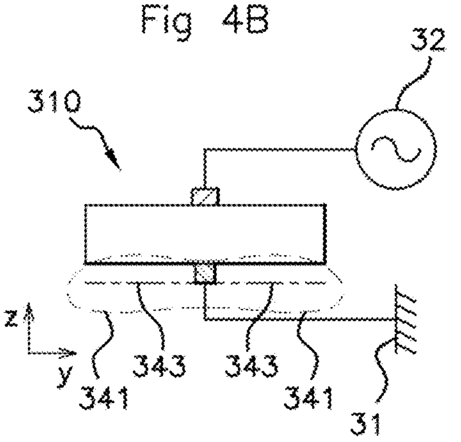
FIG. 4B schematically illustrate the T-antenna of FIGS. 3A to 3D, in use.

FIGS. 4A and 4B schematically illustrate the T-antenna 310 of FIGS. 3A to 3D, in use. FIG. 4A is a view from above, in an (Oxy) plane, with the dielectric substrate 312 shown as see-through. FIG. 4B is a view of a cross section through an (Oyz) plane.

In use, the first ground plane 313 is electrically connected to the electrical ground 31, while the first metal excitation surface 311 is electrically connected to an electrical power source 32 such as described above.

The T-antenna 310 has a radiation pattern comprising two high-radiation side lobes 341, separated by a low-radiation central zone 342. For ease of understanding, the radiation pattern has been shown here superposed on the antenna. The figure is not representative of the exact position of the point of origin of the transmission in the antenna (especially since it is a far-field transmission that is of interest). The relevant teaching is the general shape, and the orientation of the radiation pattern in space.

The side lobes 341 are each centered on one respective axis 343. The axes 343 are located in a plane substantially parallel to the plane of the printed circuit board. By "substantially parallel", what is meant is that an angle of inclination relative to the plane of the printed circuit board is less than or equal to 20°, or even 10°, or even 5°, in absolute value. A volume covered by the radiation pattern of the T-antenna 310 advantageously corresponds to the first detection zone Z1 and to the second detection zone Z2, respectively (see FIG. 2).

The axes 343 (and the side lobes 341) here have a planar symmetry, relative to a plane orthogonal to the (Oxy) plane of the printed circuit board and parallel to the stem 3132A of the T-shaped region. The axes 343 (and the side lobes 341) here have a planar symmetry, relative to an (Oxz) plane.

The angular offset between the axes 343 is advantageously between 120° and 160°, where an angle of 180° corresponds to pi radians.

A variant 510 which will only be described in terms of its differences relative to the antenna of FIGS. 3A to 3C will now be described with reference to FIGS. 5A to 5C.

Figure 5A:
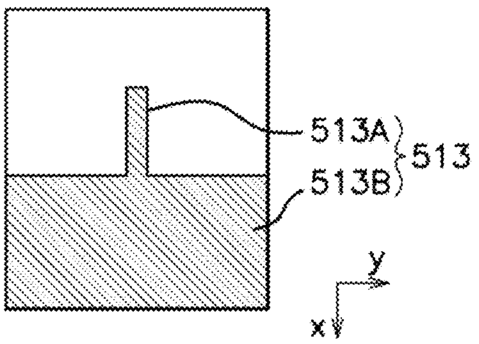
FIG. 5A.

FIG. 5A shows the first ground plane 513, as seen from above in an (Oxy) plane. The first ground plane 513 here consists of a rectilinear region, 513A, and a main region 513B, formed together in one piece.

Figure 5B:
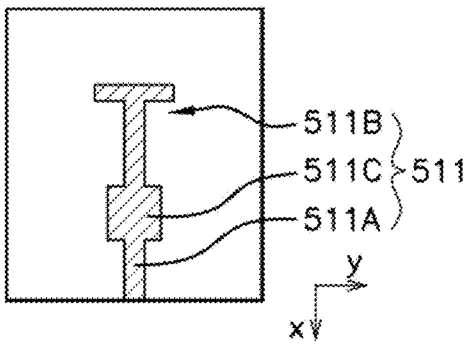
FIG. 5B.

FIG. 5B shows the first metal excitation surface 511, as seen from above in an (Oxy) plane. The first metal excitation surface 511 is here formed by a conductive line 511A, a T-shaped region 511B, and an impedance-matching surface 511C.

The definition of a T-shaped region is the same as above.

The impedance-matching surface 511C is such as described above. It lies at a distance from the T-shaped region.

The conductive line 511A is located in continuity with the stem of the T of the T-shaped region 511B, and has the same width as said stem.

Figure 5C:
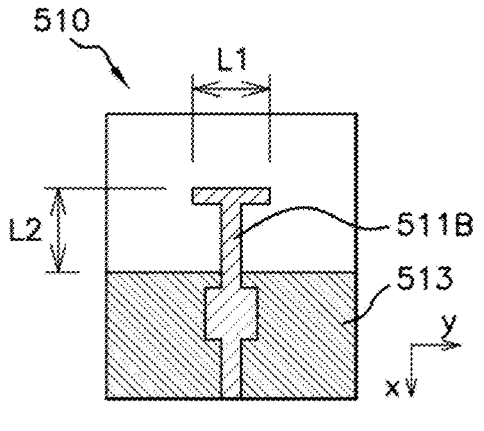
FIG. 5C schematically illustrate various views of a second embodiment of a T-antenna in a transmitting and/or receiving device according to the invention.

FIG. 5C shows the antenna 510, as seen from above in an (Oxy) plane, with a see-through dielectric substrate to make it easier to read the figure.

FIG. 5C shows that the rectilinear segment 513A of the first ground plane 513 is superposed with the stem of the T of the T-shaped region 511B.

Said rectilinear segment 513A extends to an upper end of the T-shaped region 511B, on the side of the arm of the T. Said rectilinear segment 513A does not protrude beyond the arm of the T.

The opposite end of the rectilinear segment 513A, which end is located at the interface with the main region 513B of the first ground plane 513, defines the interface between the conductive line 511A and the T-shaped region 511B.

The details given above in respect of the dimensions of the T-shaped region apply in the same way in this variant.

In use, the first ground plane and the first metal excitation surface are connected in the same way as described with reference to FIGS. 4A and 4B, to obtain a similar radiation pattern.

Figure 6A:
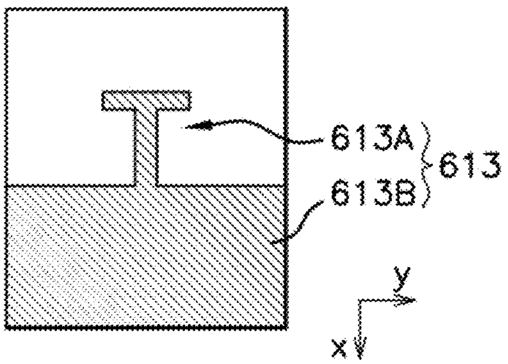
FIG. 6A.
Figure 6B:
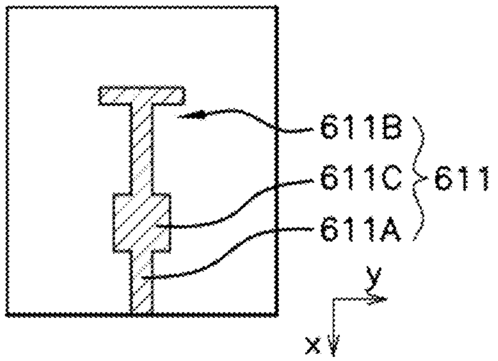
FIG. 6B.

A variant 610 which will only be described in terms of its differences relative to the antenna of FIGS. 5A to 5C will now be described with reference to FIGS. 6A to 6C.

Here, the first ground plane 613 is such as described with reference to FIGS. 3A to 3C. It therefore consists of a T-shaped region 613A and of a main region 613B (FIG. 6A).

Furthermore, the first metal excitation surface 611 is such as described with reference to FIGS. 5A to 5C. It therefore consists of a conductive line 611A, a T-shaped region 611B, and an impedance-matching surface 611C (FIG. 6B).

Figure 6C:
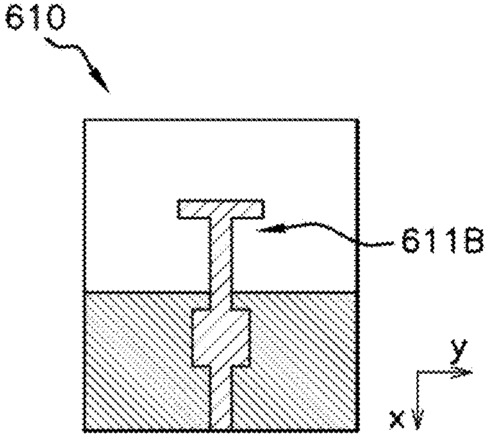
FIG. 6C schematically illustrate various views of a third embodiment of a T-antenna in a transmitting and/or receiving device according to the invention.

The T-shaped region 611B belonging to the first metal excitation surface 611 is superposed on the T-shaped region 613A belonging to the first ground plane (FIG. 6C). Impedance matching is therefore optimal.

In use, the first ground plane and the first metal excitation surface are connected in the same way as described with reference to FIGS. 4A and 4B, to obtain a similar radiation pattern.

One embodiment of a rectangular antenna in a transmitting and/or receiving device according to the invention will now be described with reference to FIGS. 7A to 7D.

In the same way as the T-antenna, the rectangular antenna 720 is formed on a printed circuit board, and comprises, superposed in this order along an (Oz) axis orthogonal to the (Oxy) plane of the printed circuit board:

a second metal excitation surface 721;

a dielectric substrate 722; and a second ground plane 723.

Figure 7A:
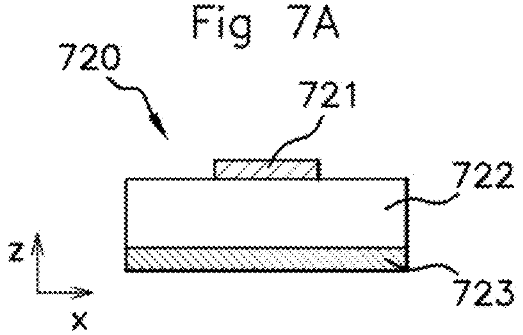
FIG. 7A.

FIG. 7A shows the rectangular antenna 720 seen in cross section through an (Oxz) plane orthogonal to the (Oxy) plane of the printed circuit board.

The definition of a ground plane and of a metal excitation surface, respectively, is the same as that given with reference to the T-antenna. Likewise, the second ground plane 723 and the second metal excitation surface 721 are formed by metallizations on two opposite faces of a layer of the printed circuit board (dielectric substrate 722).

Figure 7B:
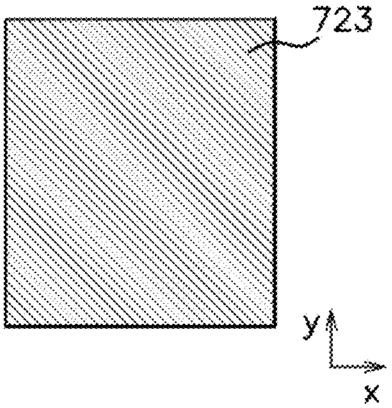
FIG. 7B.

Here, and as shown in FIG. 7B, the second ground plane 723 consists of a metal surface that is planar, and for example square or rectangular.

Figure 7C:
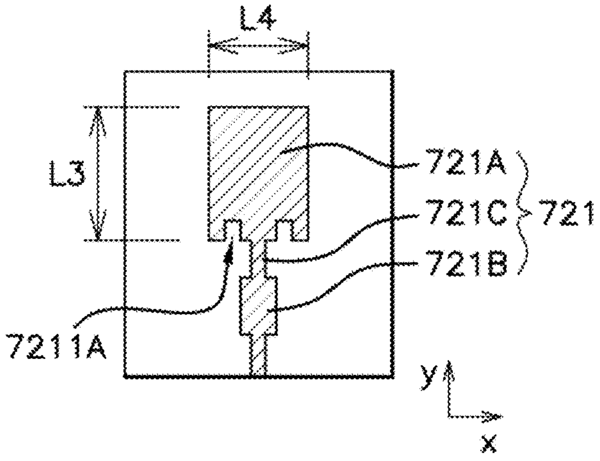
FIG. 7C.

FIG. 7C shows the second metal excitation surface 721, as seen from above in an (Oxy) plane. The second metal excitation surface 721 comprises a rectangular region 721A, an impedance-matching region 721B, and a conductive line 721C that ensures electrical connection to an electrical power source. The second metal excitation surface 721 has planar symmetry, relative to a plane orthogonal to the (Oxy) plane.

The rectangular region 721A is here at the origin of the electromagnetic radiation of the rectangular antenna 720. The rectangular region 721A has a rectangular general shape.

Here, the rectangular region 721A has the shape of a rectangle provided with two small recesses 7211A on either side of the zone where it interfaces with the conductive line 721C. These two small recesses 7211A assist with impedance matching to 50Ω over a wide frequency range. The cumulative area of these recesses is less than 10% of the total area of the rectangular region 721A. The rectangle has a height L3, defined here along the (Oy) axis, and a width L4, defined here along the (Ox) axis, with L3 strictly greater than L4.

Preferably, the ratio L3/L4 is greater than or equal to 1.5, or even greater than or equal to 1.8. This ratio is advantageously between 1.5 and 2.3, or even between 1.8 and 2.3, inclusive of limits. In this respect, the invention differs from known prior-art patch antennas, which are of substantially square shape.

Advantageously, a ratio L3/$\lambda_2$ is between 0.8 and 1, with $\lambda_2$ the central wavelength of a radio-frequency signal that the rectangular antenna 720 is configured to transmit and/or receive (preferably $\lambda_1=\lambda_2$). Thus, the length L3 is for example between 8 mm and 150 mm, for a signal the carrier frequency of which is between 2 GHz and 30 GHz. In this respect, the invention differs from patch antennas known in the prior art, the shape of which is substantially that of a square of side length equal to $\lambda_2/2$.

Also advantageously, a ratio L4/$\lambda_2$ is close to 0.5, for example between 0.4 and 0.6, more preferably between 0.45 and 0.55, and even more preferably between 0.48 and 0.52, with $\lambda_2$ such as described above. Thus, the length L4 is for example between 4 mm and 90 mm, for a signal the carrier frequency of which is between 2 GHz and 30 GHz.

Advantageously, L2 and L4 are substantially equal, to within +/−10%.

The rectangular region 721A is located at one end of the conductive line 721C, in direct physical contact with the latter.

The conductive line 721C has a small width, much smaller than the dimensions L3 and L4 of the rectangular region 721A. Here, but non-limitingly, the conductive line 721C extends along a rectilinear axis.

The impedance-matching region 721B is rectangular in shape, and has an area much smaller than that of the rectangular region 721A, the area ratio being greater than or equal to four. The impedance-matching region 721B is located at a distance from the rectangular region 721A, along the conductive line. The impedance-matching region 721B is centered on the conductive line 721C, in the width direction. It is intended simply to achieve impedance matching.

Figure 7D:
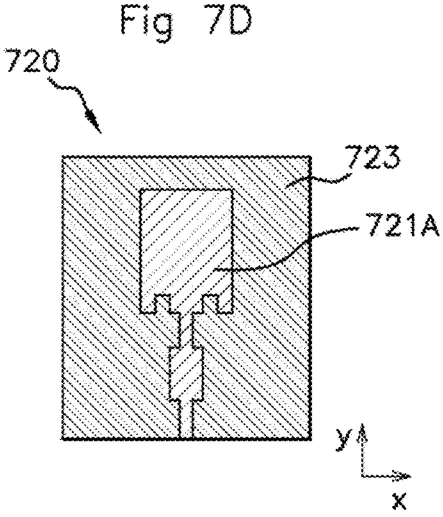
FIG. 7D schematically illustrate various views of a first embodiment of a rectangular antenna in a transmitting and/or receiving device according to the invention.

FIG. 7D shows the rectangular antenna 720, as seen from above in an (Oxy) plane, with a see-through dielectric substrate to make it easier to read the figure. FIG. 7D shows that the rectangular region 721A (and the impedance-matching region 721B) lies facing the second ground plane 723.

Figure 8A:
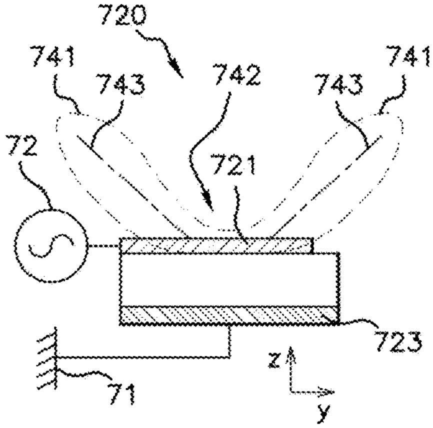
FIG. 8A.
Figure 8B:
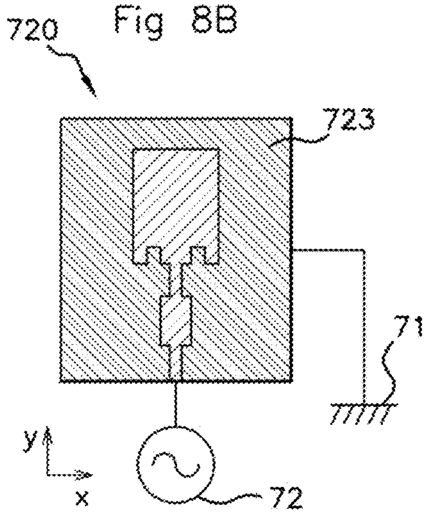
FIG. 8B schematically illustrate the rectangular antenna of FIGS. 7A to 7D, in use.

FIGS. 8A and 8B schematically illustrate the rectangular antenna 720 of FIGS. 7A to 7D, in use. FIG. 8A shows a view in cross section through an (Oyz) plane orthogonal to the plane of the printed circuit board. FIG. 8B is a view from above, in an (Oxy) plane, with the dielectric substrate shown as see-through.

In use, the second ground plane 723 is electrically connected to the electrical ground 71, while the second metal excitation surface 721 is electrically connected to an electrical power source 72 such as described above.

The rectangular antenna 720 has a radiation pattern comprising two high-radiation side lobes 741, separated by a low-radiation central zone 742. Once again, the figure is not representative of the exact position of the point of origin of the transmission in the antenna. The relevant teaching is the general shape, and the orientation of the radiation pattern in space.

The side lobes 741 are each centered on one respective axis 743. The axes 743 are located in a plane substantially orthogonal to the plane of the printed circuit board. By "substantially orthogonal", what is meant is that an angle of inclination relative to a plane orthogonal to the plane of the printed circuit board is less than or equal to 20°, or even 10°, or even 5°, in absolute value. A volume covered by the radiation pattern of the rectangular antenna 720 advantageously corresponds to the second detection zone Z2 and to the first detection zone Z1, respectively (see FIG. 2).

The axes 743 (and the side lobes 741) here have a planar symmetry, relative to a plane orthogonal to the (Oxy) plane of the printed circuit board and parallel to the long side of the rectangular region 721A. The axes 743 (and the side lobes 741) here have a planar symmetry, relative to an (Oxz) plane parallel to the long side L3 of the rectangular region 721A. The angular offset between the axes 743 is advantageously between 120° and 160°.

Figure 9:
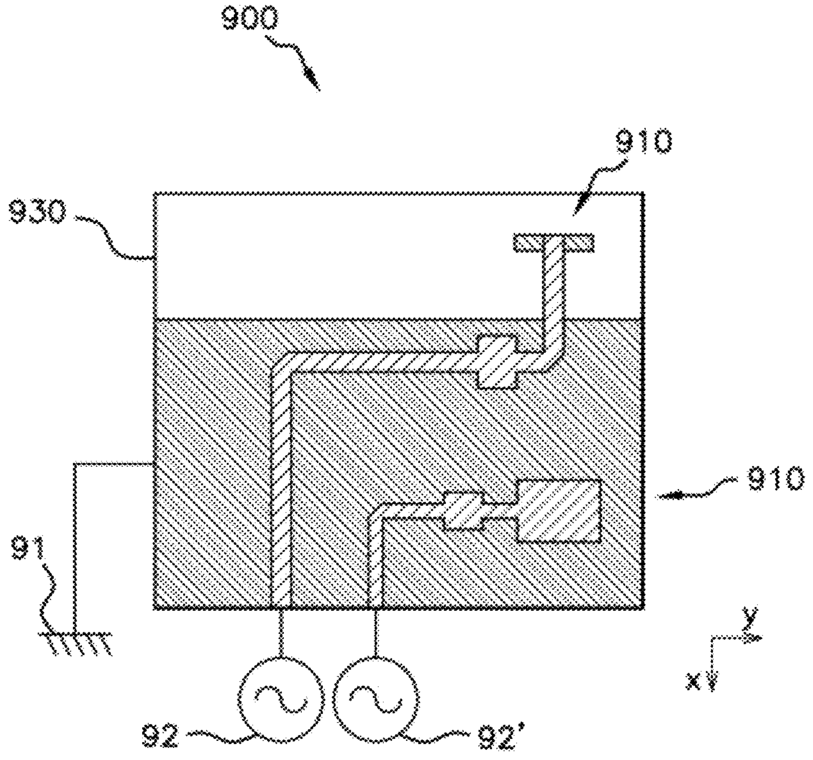
FIG. 9 schematically illustrates one example of a transmitting and/or receiving device according to the invention.

FIG. 9 schematically illustrates one example of a transmitting and/or receiving device 900 according to the invention. The device 900 comprises, integrated into the same printed circuit board 930:

- a T-antenna 910 according to the invention, here such as illustrated in FIGS. 3A to 3D; and
- a rectangular antenna 920 according to the invention, here such as illustrated in FIGS. 7A to 7D.

The same metal surface may form the first and second ground planes for the two antennas, respectively, and be connected to the electrical ground 91, in use. As a variant, the first and second ground planes lie in distinct layers of the printed circuit board, and are both connected to the electrical ground 91, in use.

On the opposite side of the printed circuit board, distinct metal surfaces form the metal excitation surface of the T-antenna and the metal excitation surface of the rectangular antenna, respectively, these being connected in use to a first electrical power source 92 and to a second electrical power source 92', respectively.

Advantageously, and as shown in FIG. 9, the stem of the T of the antenna 910 is perpendicular to the long side of the rectangular region of the rectangular antenna 920. This arrangement makes it possible to obtain the desired orientations of the four main transmission lobes together associated with the two antennas, in a gesture-detecting context such as described in the introduction.

Advantageously, and as shown in FIG. 9, the T-antenna 910 and the rectangular antenna 920 are further aligned along an axis parallel to the stem of the T and to said long side. This arrangement allows interference between the two antennas to be minimized. It further ensures that the radiation transmitted by the two respective antennas has a substantially common origin.

Advantageously, the device according to the invention further comprises electronic components (not shown) for shaping an electrical signal and/or for performing pre-processing, which components are integrated into the same printed circuit board. Such electronic components are configured to shape a respective signal sent as input to each of the antennas of the transmitting and/or receiving device according to the invention, and/or to perform pre-processing (in particular mixing and filtering) of electrical signals delivered as output by each of said antennas.

Preferably, the printed circuit board accommodates at least one antenna the radiation pattern of which is oriented in a plane substantially parallel to the plane of the printed circuit board, and at least one antenna the radiation pattern of which is similar but oriented in a plane substantially orthogonal to the plane of the printed circuit board. Thus, a 90° rotation of the printed circuit board preserves the orientations of the radiation patterns. It is therefore possible to orient the printed circuit board freely, depending on local integration constraints.

Figure 10:
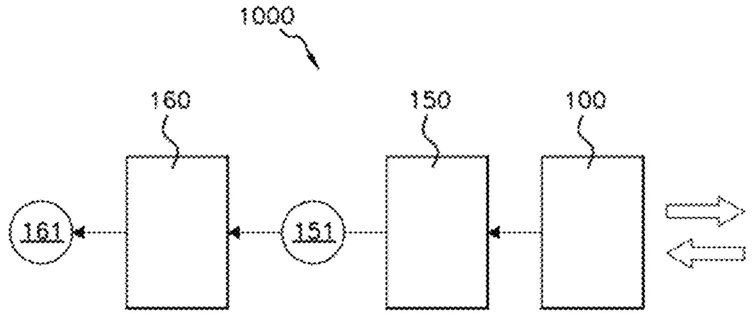
FIG. 10 schematically illustrates a gesture-detecting system according to the invention.

Lastly, FIG. 10 schematically illustrates a gesture-detecting system 1000 according to the invention. The latter comprises:

- a transmitting and/or receiving device 100 according to the invention; and
- a signal-processing module 150, configured to receive as input an electrical signal from the device 100, so as to analyze said electrical signal, and to deliver as output information 151 relating to a gesture made by a human operator.

The signal-processing module 150 comprises at least one processor, at least one memory, and input and output interfaces. It is for example a question of at least one microcontroller.

Here, and advantageously, the system 1000 further comprises a unit 160 for controlling opening, configured to receive as input the information 151 relating to a gesture, and to deliver an instruction 161 to open a motor-vehicle hatch when said information 151 relates to a predetermined gesture.

The unit 160 for controlling opening comprises at least one processor, at least one memory, and input and output interfaces. It is for example a question of at least one microcontroller.

The invention is not limited to the examples described above, and covers many variants of the device according to the invention, for example corresponding to other combinations of a T-antenna and a rectangular antenna.

The invention has been described in the context of control of opening of a trunk or tailgate, but is applicable to remote control of a function of a motor vehicle in other ways, for example control of opening of a side door with a device according to the invention integrated into a side pillar of the vehicle.

In unclaimed variants of the T-antenna, a T-shaped region is formed by a half-T located in the first ground plane, and a half-T belonging to the first metal excitation surface, where the two half-Ts are symmetrical to each other in a plane orthogonal to the plane of the printed circuit board.

The invention claimed is:

1. A device (20; 900) for transmitting and/or receiving radio-frequency signals, which is intended to be integrated into a gesture-detecting system in a motor vehicle, and which comprises:

- a printed circuit board (930);
- at least one first radio-frequency antenna (310; 510; 610; 910), integrated into the printed circuit board and dedicated to transmitting and/or receiving a radio-frequency signal propagating through a first detection zone (Z1); and
- at least one second radio-frequency antenna (720; 920), integrated into the printed circuit board and dedicated to transmitting and/or receiving a radio-frequency signal propagating through a second detection zone (Z2) distinct from the first detection zone;

characterized in that:

- the at least one first radio-frequency antenna (310; 510; 610; 910) consists of at least one patch antenna, called the T-antenna, comprising superposed a first metal excitation surface (311; 511; 611) and a first ground plane (313; 513; 613), at least one of the first ground plane and the first metal excitation surface having a T-shaped region (313A; 511B; 613A), so that the radiation pattern of the T-antenna has two high-radiation side lobes (341) separated by a low-radiation central zone (342); and
- the at least one second radio-frequency antenna (720; 920) consists of at least one patch antenna, called the rectangular antenna, comprising superposed a second metal excitation surface (721) and a second ground plane (723), the second metal excitation surface comprising a rectangular region (721A) having a general rectangle shape and configured so that the radiation pattern of the rectangular antenna has two high-radiation side lobes (741) separated by a low-radiation central zone (742).

2. The device (20; 900) as claimed in claim 1, characterized in that:

the two high-radiation side lobes (341) of the radiation pattern of the T-antenna are oriented along two respective axes (343), both located in a plane that is inclined by less than 10° in absolute value relative to the plane of the printed circuit board (930); and the two high-radiation side lobes (741) of the radiation pattern of the rectangular antenna are oriented along two respective axes (743), both located in a plane that is inclined by less than 10° in absolute value relative to a plane orthogonal to the plane of the printed circuit board (930).

3. The device (20; 900) as claimed in claim 1, characterized in that the T-shaped region (313A; 511B; 613A) has a stem (3132A) and an arm (3131A), where the arm is formed by a first rectilinear bar of length L1, and where the stem is formed by a second rectilinear bar perpendicular to the first rectilinear bar.

4. The device (20; 900) as claimed in claim 3, characterized in that a ratio L1/$\lambda_1$ is between ⅛ and ⅙, where $\lambda_1$ is the central wavelength of a radio-frequency signal transmitted and/or received by the T-antenna (310; 510; 610; 910), in use.

5. The device (20; 900) as claimed in claim 3, characterized in that the T-shaped region (313A; 511B; 613A) has a height L2, defined along an axis parallel to the second rectilinear bar (3132A), and in that a ratio L2/$\lambda_1$ is between 0.45 and 0.65, where $\lambda_1$ is the central wavelength of a radio-frequency signal transmitted and/or received by the T-antenna (310; 510; 610; 910), in use.

6. The device (20; 900) as claimed in claim 3, characterized in that the T-shaped region (313A; 511B) belongs to one of the first ground plane (313; 513) and the first metal excitation surface (311; 511), with the stem (3132A) of the T superposed and aligned with a rectilinear region (311A; 513A) of the other of the first ground plane and the first metal excitation surface.

7. The device (20) as claimed in claim 3, characterized in that the T-shaped region (613A) belongs to one of the first ground plane and the first metal excitation surface, and lies facing a second T-shaped region (611B) belonging to the other of the first ground plane and the first metal excitation surface.

8. The device (20; 900) as claimed in claim 1, characterized in that the T-shaped region (313A; 613A) belongs to the first ground plane (313; 613.

9. The device (20; 900) as claimed in claim 1, characterized in that the rectangular region (721A) of the rectangular antenna (720; 920) has a height L3 and a width L4, with a ratio L3/L4 greater than or equal to 1.5.

10. The device (20; 900) as claimed in claim 9, characterized in that a ratio L3/$\lambda_2$ is between 0.8 and 1, where $\lambda_2$ is the central wavelength of a radio-frequency signal transmitted and/or received by the rectangular antenna (720; 920), in use.

11. The device (20; 900) as claimed in claim 9, characterized in that a ratio L4/$\lambda_2$ is between 0.45 and 0.55, where $\lambda_2$ is the central wavelength of a radio-frequency signal transmitted and/or received by the rectangular antenna (720; 920), in use.

12. The device (20; 900) as claimed in claim 1, characterized in that:

the T-antenna (310; 510; 610; 910) is configured so that its two high-radiation side lobes (341) are oriented along two respective axes (343) that are inclined to each other by an angle between 120° and 160°; and the rectangular antenna (720; 920) is configured so that its two high-radiation side lobes (741) are oriented along two respective axes (743) that are inclined to each other by an angle between 120° and 160°.

13. A gesture-detecting system (1000), intended to be integrated into a motor vehicle (2), and comprising:

a device (20; 900) as claimed in claim 1; and a signal-processing module (150), configured to receive as input an electrical signal from said device (20; 900), and to analyze said electrical signal so as to deliver as output information (151) relating to a gesture made by a human operator.

14. The system (1000) as claimed in claim 13, characterized in that it further comprises a unit (160) for controlling opening, configured to receive as input the information (151) relating to a gesture made by a human operator, and to deliver in response an instruction (161) to open a motor-vehicle hatch.

15. A motor vehicle (2) comprising a device (20; 900) as claimed in claim 1, wherein said device (20; 900) is arranged at the rear of the motor vehicle, with one of the first and second detection zones (Z1; Z2) which is oriented toward behind the vehicle, and with the other of the first and second detection zones (Z2; Z1) which is oriented toward the ground, in use.

* * * * *